Aug. 4, 1942.   J. F. RIDER ET AL   2,291,648
ELECTRICAL TESTING METHOD AND APPARATUS
Filed Feb. 15, 1939     4 Sheets-Sheet 2
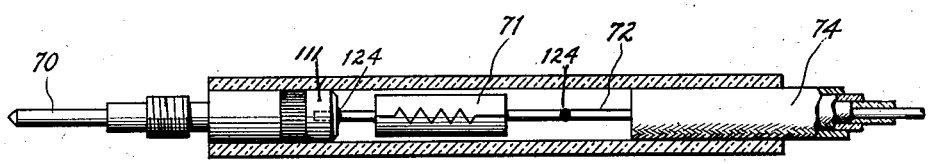
Fig. 3.
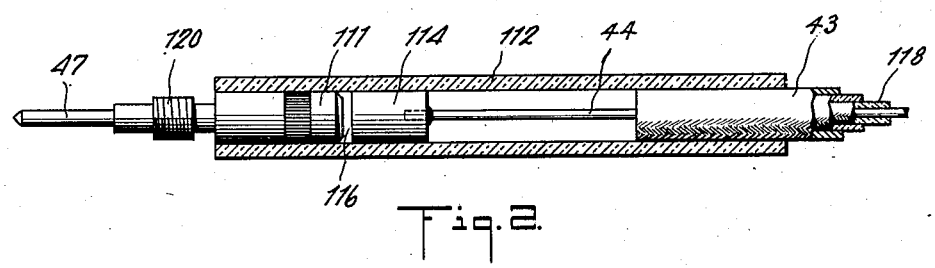
Fig. 2.
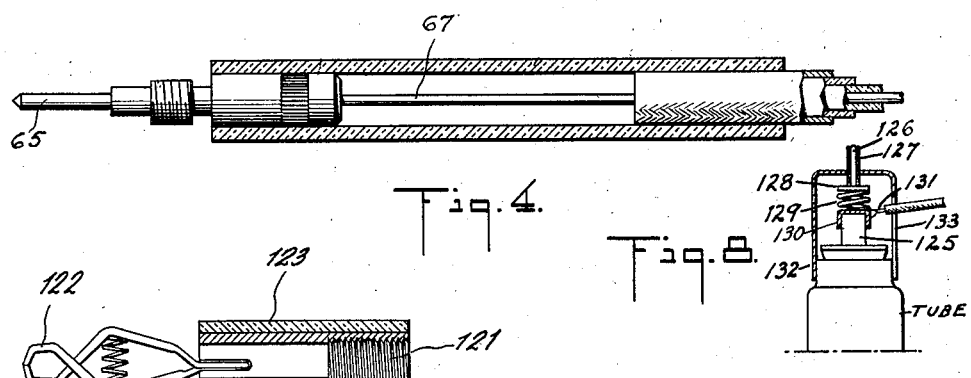
Fig. 4.
Fig. 8.
Fig. 5.
John F. Rider
Jack Avins
INVENTORS
BY
John J. Rogan
ATTORNEY

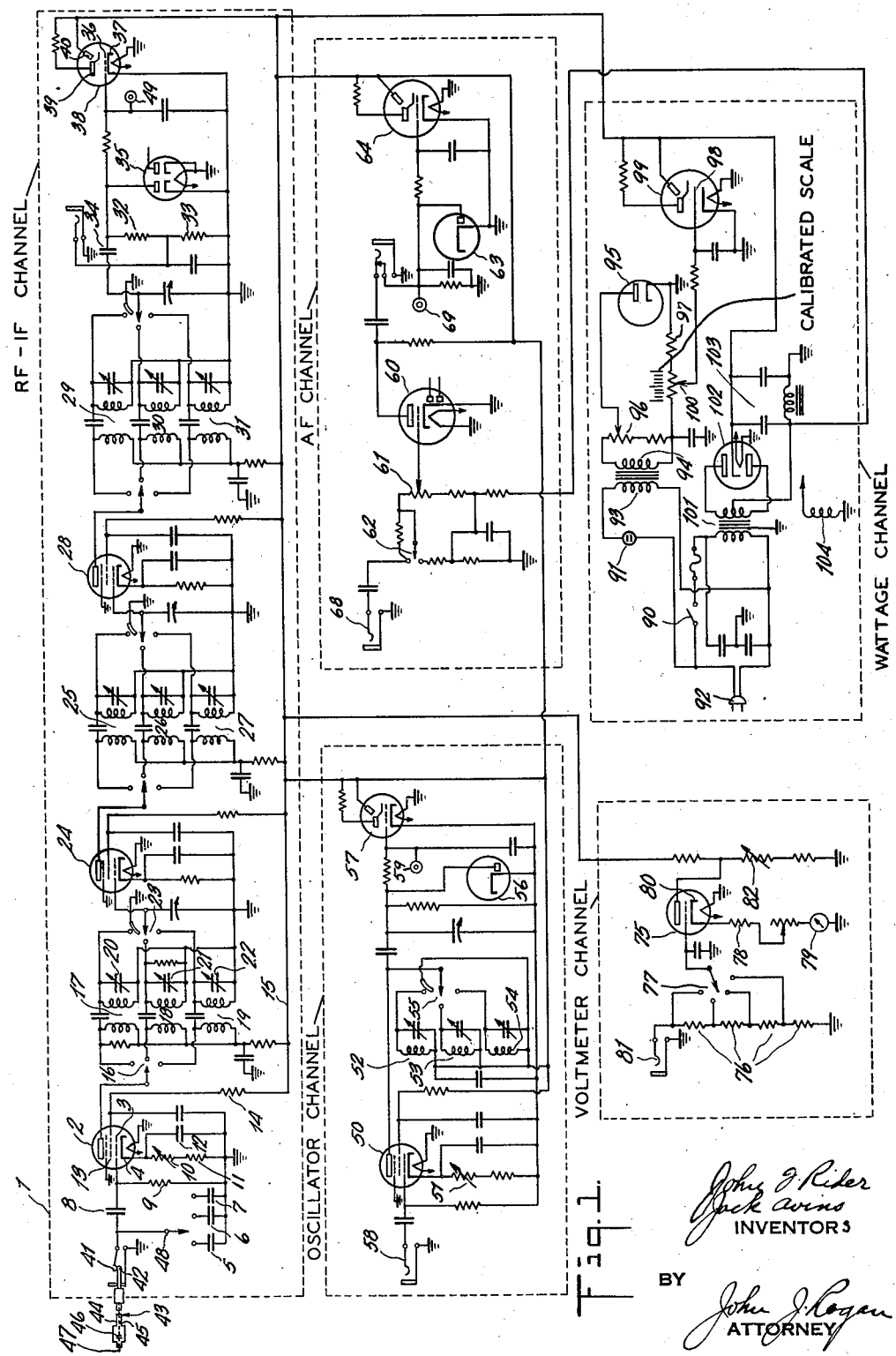

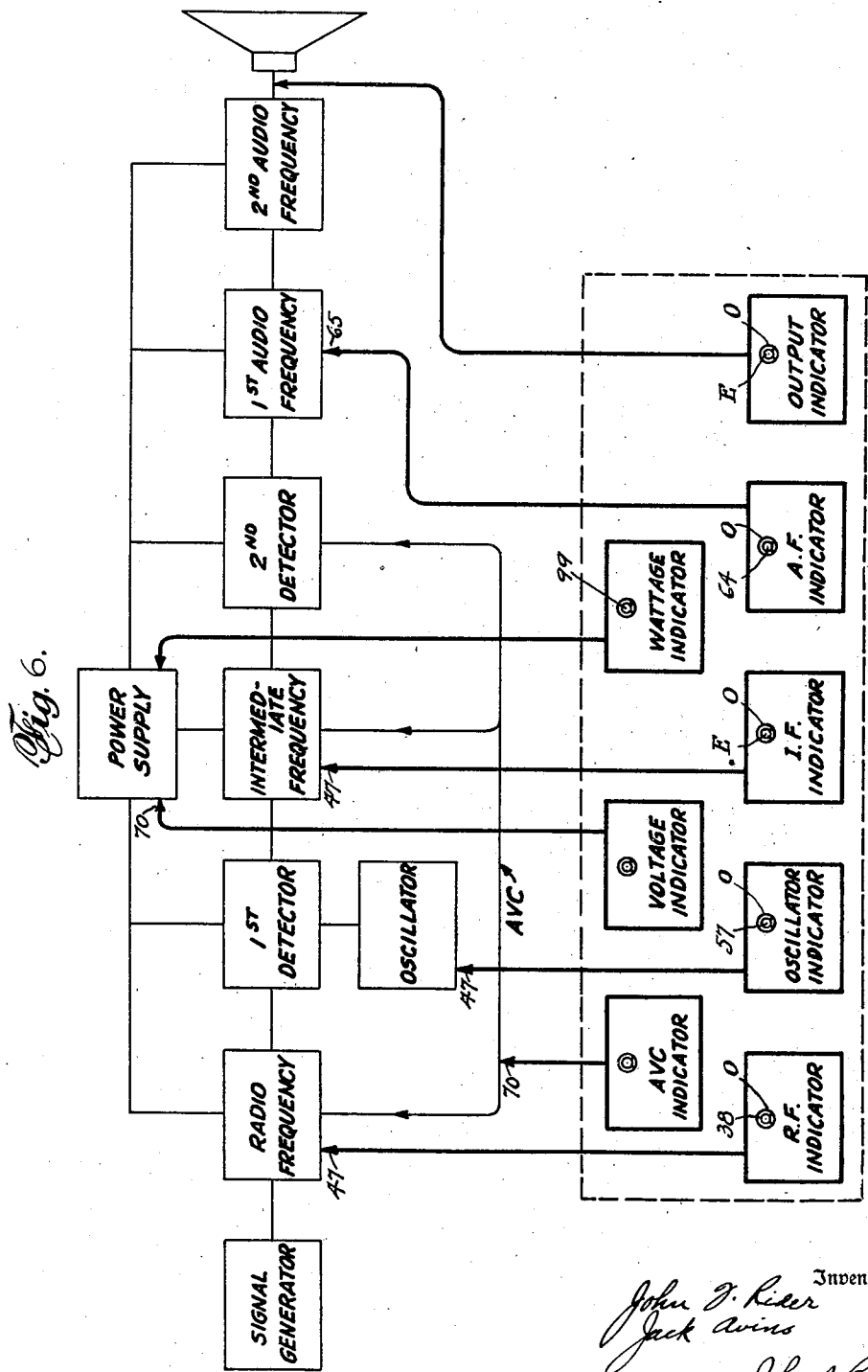

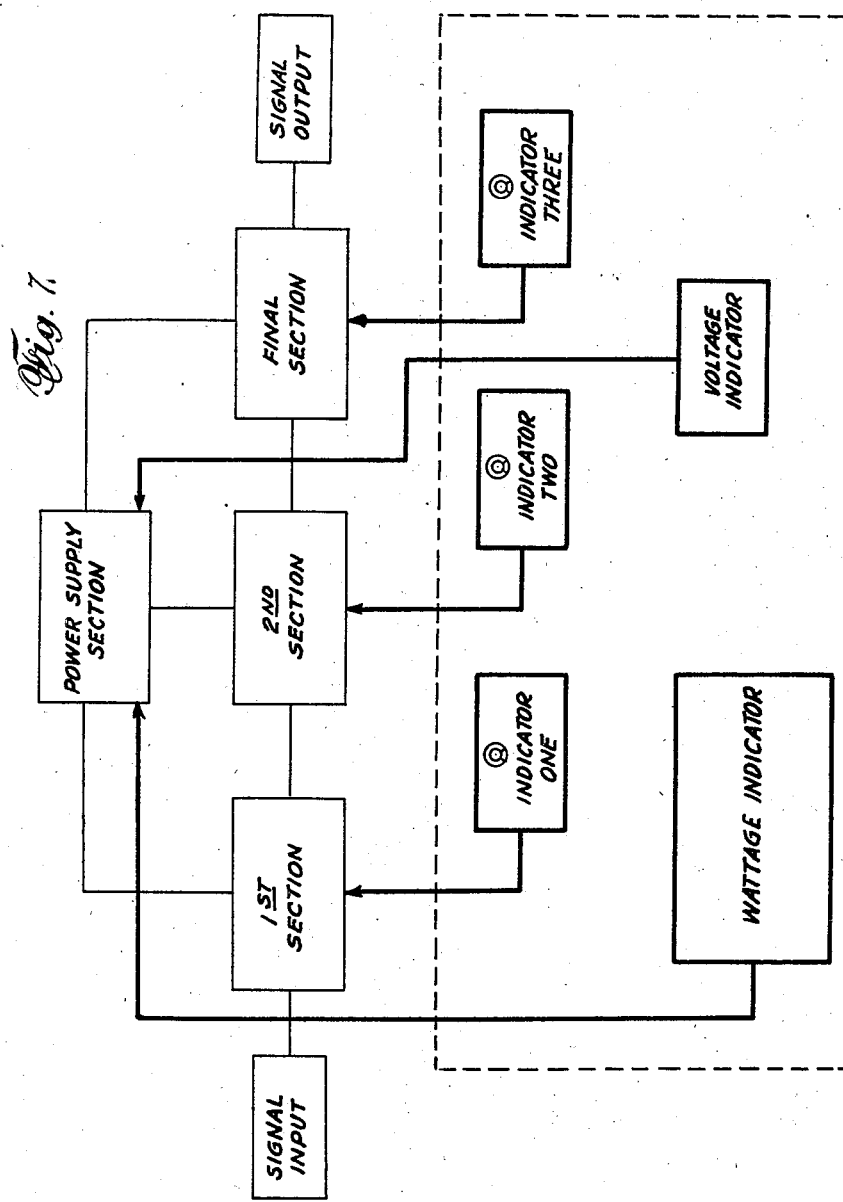

Patented Aug. 4, 1942

2,291,648

UNITED STATES PATENT OFFICE 2,291,648

ELECTRICAL TESTING METHOD AND APPARATUS

John F. Rider and Jack Avins, New York, N. Y.

Application February 15, 1939, Serial No. 256,438

4 Claims. (Cl. 171—95)

This invention relates to electrical testing apparatus and more especially to apparatus for testing or supervising the dynamic as well as the static operating conditions of such devices as radio receivers, wave amplifiers, repeaters and the like.

While various methods and devices have been proposed heretofore for testing such devices as radio receivers, they have in general been open to the objection that the test equipment is limited as to the number and kind of conditions that can be checked. This is particularly true with respect to the checking of disturbances or faults which are intermittent in character. Furthermore, as is well known, present day radio receivers and amplifiers, employ tubes and circuits which are extremely sensitive both as to gain and tuning, with the result that ordinary methods of testing by connecting a device such as a pair of telephones or the like to the circuit components by way of a test probe, are not reliable. Thus, while these prior methods are capable of locating extremely abnormal conditions such as accidental grounds, open circuits and the like, they are of very little value where dynamic conditions are to be checked, such as oscillator tuning, defective condensers, loss or gain between various circuits and the like. In order to check the operation of such devices as high gain or sensitive radio receivers, it is important to employ a testing device which has substantially negligible effect on the normal operation of the device being tested. This is particularly true where the high frequency or tuned circuit portions of a device are being checked. Furthermore, in order properly to check such devices, it is important that the checking instrument be coupled to the device under test by an isolating member such as a capacity which is below a predetermined maximum value.

Furthermore, in order to arrive at a reliable result, it is important that the conditions during actual operation be capable of being checked with a predetermined accuracy. We have found that by employing the above-noted isolating element as part of a calibrated artificial line or input attenuator, it is possible to determine conditions which might not otherwise be ascertainable.

Accordingly, it is a principal object of this invention to provide a novel method and apparatus for checking expeditiously and accurately the normal or abnormal operating conditions of such devices as radio receivers, wave amplifiers and the like.

Probably, one of the most baffling and most time-consuming conditions encountered in checking radio receivers, is that of intermittent operation. Heretofore, no satisfactory method of localizing the cause of such conditions has been provided. It has been the usual practice heretofore to test a number of the more important points in a radio receiver successively until eventually the fault is localized. It is obvious therefore, that the time required to localize the source of the intermittent condition, is very great and especially so where there is more than one cause of such intermittent condition; because not only must the checking await a condition of non-operation, but causes may at one instant be simultaneous and at another instant successive. It is apparent therefore, that any instrument which enables such devices as radio receivers and the like to be checked so that one or more sources of such intermittent operation can be ascertained almost immediately, is of great advantage not only to the radio manufacturing industry but also to the radio servicing industry. We have found that by employing a unitary checking instrument which is provided with a plurality of channels operated from a common power supply similar to that of a radio receiver, it is possible to secure instantaneous and accurate indications of all the conditions at the key points of a radio receiver. Furthermore, by employing a probe or connector with an isolating capacitor forming an integral part thereof, and which capacitor forms part of a calibrated input attenuator network, the checking can be done with the assurance that no false conditions are being introduced by the checking instrument itself, and the same conditions can be checked repeatedly with the same comparative results or settings of the check indicators.

Accordingly, it is another principal object of this invention to provide a unitary device which can be attached to any type of radio receiver or similar electric wave device, for giving continuous and instantaneous indications of the conditions at a plurality of key points in the device under test. Preferably, and in accordance with the invention, these indications are produced by inertialess devices such as electron indicator tubes, referred to in the radio tube art as "electric eyes" and sold for example under the name "Radiotron" type 6E5 or the like.

Another object is to provide a testing instrument for electric wave signalling apparatus which instrument is controlled dynamically by the signal which exists in the apparatus under test, but without affecting the normal operation of such apparatus.

A feature of the invention relates to a novel form of testing probe and cable which acts to isolate the capacity and inductance of the cable from the probe point.

Another feature of the invention relates to a novel form of testing probe which has incorporated integrally thereunder an isolating capacitor which also forms part of a calibrated attenuator network for testing.

Another feature relates to an improved form of volt meter probe.

Another feature relates to a novel form of electronic volt meter for measuring D. C. voltage conditions, for example in a radio receiver or the like under test.

Another feature relates to a novel form of wattage indicator for measuring the power consumption of such devices as radio receivers and the like.

A further feature relates to the novel organization, arrangement and interconnection of parts whereby there is provided a unitary instrument for localizing faults in wave signalling apparatus generally, for example radio receivers, wave amplifiers, repeaters, power supply units and the like.

A still further feature relates to a novel unitary servicing instrument for indicating the character of the signal, its absence or presence or its standard or unstandard character, at any one or a number of key points of radio receivers, amplifiers and the like.

Other features and advantages not specifically enumerated will be apparent after a consideration of the following detailed descriptions and the appended claims.

While the invention finds its greatest utility in the testing of such devices as radio receivers, in certain of its phases the invention is applicable to the checking or testing of wave transmitting or receiving apparatus generally. While therefore, the invention will be described as applied to the testing of certain well known types of radio receivers, it is also applicable to radio transmitters, amplifiers, repeaters and the like.

Referring to the drawings, Fig. 1 is a schematic circuit diagram of the various channels of the unitary checking instrument according to the invention.

Fig. 2 is a detailed view, partly sectional, of a high frequency probe and cable according to the invention.

Fig. 3 is a detailed view, partly sectional, of the voltage probe according to the invention.

Fig. 4 is a detailed view, partly sectional, of a low frequency probe according to the invention.

Fig. 5 is a view of a detachable clip that may be used with the probes of Figs. 2, 3 and 4.

Fig. 6 is a block diagrammatic view showing the testing instrument of Fig. 1 as used to check various parts of a radio receiver of the superheterodyne type.

Fig. 7 is a block diagrammatic view showing the instrument of Fig. 1 as used in checking a power amplifier.

Fig. 8 shows a modification of the probe of Fig. 2 for use with radio tubes of the top-cap contact type.

In general, the instrument shown in Fig. 1, operates by utilizing the dynamic signal as it actually exists in the device under test. For example, one channel of the instrument, for example the high frequency channel designated herein as the RF—IF channel, is controlled by the received modulated carrier wave as it exists in the high frequency portion of a radio receiver under test and also by the resultant intermediate frequency wave where the receiver is of the superheterodyne type. Likewise, another channel designated herein as the "oscillator channel" is controlled by the signal as it actually exists in the oscillator stage or other part of a superheterodyne receiver. The third channel of the instrument designated, as the "audio frequency channel," is controlled by the audio frequency signal as it actually exists in the low frequency portion of the receiver. The fourth channel referred to as the "electronic volt meter" channel is used to measure the D. C. voltage at any portion of the receiver including for example grid bias, A. V. C. potential, power supply voltage, etc. The fifth channel referred to as the "wattage indicator" is controlled by the power input to the receiver under test.

Associated with each channel except the voltage channel, is a visual indicator of the inertialess type, preferably, of the electron indicator tube type, for example a tube of the type referred to in the radio receiver art as a tuning indicator tube, or "Magic Eye," an example of which is that sold in the trade as "Radiotron" type 6E5 or the like. This visual indicator enables comparisons to be instantaneously and visually made between various conditions in the equipment under test. Preferably, although not necessarily, the circuits are so arranged that the electron volt meter channel can be connected in place of or in conjunction with each visual indicator so as to give an additional quantitative indication of the conditions being tested. The various components of the instrument as well as the connecting cables and the like are so arranged and shielded that the reaction of the instrument on the equipment being tested is substantially negligible, and the inputs to the various channels of the instrument are provided with calibrated networks which can be adjusted to ascertain directly from their setting, the relative gain conditions at the various points being tested. In accordance with the invention, the high frequency channel referred to herein as the RF—IF channel, is provided with an isolating coupling capacitor which forms part of a specially calibrated attenuator network, whereby conditions of widely varying characteristics in the high frequency portions of a radio receiver can be tested. Preferably, also, the RF—IF channel, the oscillator channel, the "electronic volt meter" channel, have means for adjusting the gain or level thereof, the adjustment being correlated to the attenuator network to act as a direct reading multiplier therewith.

The RF—IF channel

This channel of the instrument may be used to test any point in a radio receiver or the like, where high frequency potentials are supposed normally to exist and this channel is indicated in Fig. 1 by the block RF—IF. It comprises three cascaded high frequency amplifier stages, each stage preferably employing a tube of the high gain, low interelectrode capacity type, for example a pentode tube of the type 6K7. The first stage tube is indicated by numeral 2 and connected across the control grid 3 and cathode 4 thereof is a specially designed and calibrated attenuator network comprising capacitors 5, 6, 7, 8 and resistor 9. For the purpose of varying the gain of the amplifier, the negative bias of control grid 3 with respect to cathode 4 is adjustable by means of the variable resistor 10 through which the anode-cathode current flows. Preferably, resistor 10 is provided with a calibrated scale and pointer for purposes to be described. In accordance with the usual practice, the biasing resistance and the series resistance 11 are shunted by a suitable capacity 12.

The screen-grid 13 is connected through a limiting resistor 14 to common high potential D. C. conductor 15. The output of the first stage is connected through a three-position band-change switch 16 whereby the respective coupling coils for the selected band are connected in circuit. The coils 17 are wound to pass the band from 95 k. c. to 260 k. c.; the coils 18 pass the band 240 k. c.–630 k. c.; the coils 19 pass the band 600 k. c.–1700 k. c. Preferably, the band coupling units are designed to provide a substantially flat amplification factor over each band, the band pass circuits being tuned in the well-known manner by respective tuning condensers 20, 21, 22. The three-position band-change switch also includes an additional set of three contacts 23 for connecting the respective band pass coupling to the input electrodes of the second stage tube 24. Preferably, tube 24 is of the pentode-type similar to tube 2. Tube 24 feeds through a similar band-pass switch and set of band-pass coupling coils 25, 26, 27, to the input electrodes of amplifier tube 28 of the pentode-type. Likewise, the output of tube 28 is connectable through a similar three-position band change switch and coupling coils 29, 30, 31. The coupling coils are also connectable through another section of the band-change switch across the resistors 32, 33, and through capacitor 34. The amplifier output is then rectified in a suitable rectifier tube 35 which for example may be of the type 6H6. The rectified output is applied across the control electrode 36 and cathode 37 of an electron ray indicator tube 38, for example a tube of the "Radiotron" type 6E5, the anode of which is designated 39 and the fluorescent target of which is designated 40. As is well known, this type of tube produces a fluorescent band of variable area in accordance with the potentials impressed upon the control grid 36. In one type of tube of this kind, the luminescent target is referred to as the "eye" and the luminescent band can extend throughout substantially 360° of the target, representing what will be termed herein a closed condition of the indicator eye. Preferably, the various components of the tuned circuits are enclosed within suitable shields whereby undesirable interaction and reradiation from the instrument are substantially completely eliminated.

In order to control the amplifier, the input of tube 2 is connected to a suitable jack 41 which is adapted to receive the plug 42 attached to a special connecting cable 43. Cable 43 has a single conductor 44, consisting preferably of multi-stranded wire insulated from the enclosing sheath 45 of a braided metal wire, the sheath being grounded upon insertion of the plug 42 into the jack. The opposite end of wire 44 is connected to one terminal of a small condenser 46, the other terminal of which is connected to the probe 47. In accordance wth the invention, condenser 46 is of the order of one micro-microfarad so that the cable 43 and the instrument connected thereto exert substantially negligible detuning effect on any tuned circuit of the receiver to which it is connected during testing. While the capacity of element 46 will, in a large measure, be determined by the sensitivity of the receiver under test, for present day high sensitive high gain radio receivers, we have found that the capacitance 46 should preferably not be greater than 7 or 8 micro-mocrofarads. Furthermore, in accordance with the invention, capacitance 46 forms together with capacitors 5, 6 and 7, part of the calibrated input attenuator network, so that the dial switch 48 can be calibrated accurately in gain units substantially independent of frequency. The capacitor 46 therefore performs the double function of acting as an isolating capacitor to prevent detuning of the circuits under test, while forming part of the said calibrated input attenuator network. By this combination therefore, it is possible to test any point in the high frequency portion of a radio receiver while the latter is operating, without disturbing the normal tuning or operation thereof so that successive settings of the dial switch 48 and the level control 10 represent the actual gain conditions.

Preferably, the capacitors 5, 6 and 7, are proportioned so that the impressed signals on the control grid 3 are attenuated in multiples of 10. Thus, with the switch on contact 1, the signals are applied to the grid only in series with the probe capacitor 46 and condenser 8, and the gain can be read directly from the setting of the level control 10. When switch 48 is on the second contact and the same indication is obtained on indicator 38, a setting of switch 48 represents a gain of 10. Likewise, when the switch 48 is on the third contact, it represents a gain of 100, and on the fourth contact, it represents a gain of 1000. The actual gain will of course depend also upon the setting of the level control 10. The level control is continuously variable to vary the level or amplification factor of the tube 2. Thus, by means of switch 48, and the level control switch, it is possible to check or compare signal voltages picked up by probe 47, over a calibrated ratio of 10,000 to one. In other words, it is possible by these two members, to maintain a constant indication upon the indicator 38 when the signal voltages vary over a range of 10,000 to one. Vice versa, it is possible by maintaining this same indication on the indicator 38 to determine from successive settings of devices 48 and 10, the difference between two signals picked up by the probe. An illustrative operation of this channel is as follows. Assume, two signal voltages of like frequency from different sources to be compared, one signal being designated A and the other signal being designated B. To check the relative values of these voltages, a reference indication is established on the indicator 38, for example that representing the weaker of the two signals. This is done by first setting the switch 48 and level control 10 on their number 1 positions and tuning the channel to the signal frequency A. It will be assumed that the weaker signal just closes the eye of the indicator 38. Consequently, when the stronger signal voltage B replaces the voltage A, it causes the eye to overlap, thus showing an increase in signal strength. To ascertain just how much greater signal B is than signal A, the multiplier switch 48 and the level control 10 are adjusted until the original reference indication appears on indicator 38. The positions of the switches 38 and 10 give a direct indication of the relative magnitude of the two signals. Thus, if switch 48 is in position No. 1, the voltage B is greater than the voltage A by the figure indicated by the level control switch dial. If the switch 48 is in the second position and the level control is at position 4, for example, then voltage B is forty times greater than voltage A. It will be obvious that the reference position of the indicator 38 need not necessarily be with the "eye" completely closed, as any intermediate position may be used as the reference position.

The oscillator channel

This channel comprises a single stage amplifier including pentode-tube 50, whose gain or output level can be adjusted by means of the variable control resistor 51. The output circuit is provided with three separate band-pass couplings 52, 53, 54, and associated band change switch 55 similar to the corresponding elements of the RF—IF channel. The output of the amplifier 50 is rectified by a diode 56 and the rectified output is applied to the electron ray indicator tube 57 which may be similar to the tube 38. The frequencies to be checked are picked up by a probe and cable similar to that of Fig. 1 and the oscillator channel is provided with a jack 58. By adjusting the position of the level control 51 and noting the corresponding extent of closure of the eye in tube 57, and the position of the tuning condenser associated with the particular band selected, accurate frequency checks can be made on any signals picked up by the probe. By reason of the isolating capacitance 46 in the probe, and the non-periodic character of the input circuit of tube 50, substantially negligible detuning effect is produced on the source or tuned circuits being checked.

The audio frequency channel

This channel comprises a single stage audio frequency amplifier employing a triode tube 60, for example a tube of the 6Q7 type. The amplifier tube is provided with an adjustable level control 61 and a multiplier arrangement comprising a resistor combination and a two-position switch 62, the ratio of the gain in the two positions of this switch being 100 to 1. The level control switch and multiplier switch are used in substantially the same manner as described in connection with the RF—IF channel. The output of tube 60 is rectified by diode 63 and impressed on the electric eye indicator tube 64 similar to tubes 38 and 57. Because of the low frequency current, it is not necessary to use the special isolating probe such as is used with the high frequency and oscillator channels. However, the audio frequency probe is preferably of the construction shown in Fig. 4 wherein the probe point 65 is connected to a plug such as plug 42 (Fig. 1) by a conductor 117 which is enclosed within a flexible or braided metal wire sheath 67 adapted to be grounded upon insertion of the plug in the jack 68. Thus, the control grid circuit of the amplifier tube 60 is isolated from external D. C. voltages, enabling this channel to be used in checking an audio signal at any point in a radio receiving system or any audio amplifier system. It will be understood, of course, that the components of the audio frequency channel are enclosed within suitable metal shields to prevent interaction with the other channels and to prevent reradiation outside of the instrument.

The electronic voltmeter channel

This channel can be used to measure or detect the presence of a D. C. voltage at any point in a system, even though high frequency potentials are also present at the point. In addition the channel may be used to provide a reference indicator to supplement the electric eye indicators 38, 56 and 64. For this purpose, each of these latter indicators has associated therewith a pin jack 49, 59, 69, to receive the tip of the voltmeter probe which is shown in detail in Fig. 3. This probe comprises a metal pointed tip 70 connected to a high resistance 71 of the order of 1 million ohms and through a conductor 72 to the tip of a plug similar to plug 42 (Fig. 1), the conductor 72 being insulated from and enclosed within a flexible metal sheath 74. The voltmeter includes a D. C. amplifier tube 75, for example a type 76 tube, whose input circuit includes the multiplier resistors 76 and a corresponding four-position switch 77. The cathode of tube 75 is biassed by the resistor 78 preferably to the midpoint of the linear portion of its grid voltage-plate current characteristic so that either positive or negative voltages picked up by the probe can be measured. The moving coil of the voltmeter instrument 79 is connected between the cathode 80 and ground so that the instrument registers positive or negative variations of the plate current with respect to the midpoint of the straight line portion of the plate current characteristic. By means of switch 77 and associated resistors, four separate ranges of indications may be read. Preferably, indicating meter 79 is of the central zero type with a mechanical zero adjustment of any well-known type. The tube 75 is also provided with an adjustable resistor 82 for controlling the zero position electrically. Thus, any D. C. voltage either positive or negative in the range between —500 and +500 volts can be read directly, all these values being read with a constant input impedance of approximately 10 million ohms. Thus, any D. C. voltage in the receiver under test can be checked without interfering with the normal operation of the receiver, and regardless of whether it is an operating voltage such as a heater or filament supply voltage, a plate supply voltage, or a control voltage, such as a grid-bias voltage or an A. V. C. voltage. As a result of the extremely high input impedance, high resistances which so greatly hamper the average high resistance volt meter, have substantially negligible effect on the volt meter channel. The D. C. voltage at any point in a radio receiver or other device, can be checked by simply placing the volt meter probe tip in contact with that point.

The manner of using the volt meter is substantially as follows. With the power for the instrument turned off at the power supply switch 90, the needle of meter 79 rests at the extreme left-hand of the scale, but if it is off scale, it can be adjusted to the scale limit by the usual mechanical zero adjustor. When the power is turned on at switch 90, the needle gradually rises to the central zero of the scale. The volt meter plug is then inserted into jack 81 and with the probe 70 in contact with the metal frame of the instrument or other reference ground point, resistor 82 is adjusted to make sure that the needle is at the central zero. The ground clip lead for the instrument is then connected to the chassis or other base potential point of the receiver under the test, whereupon the probe 70 can be applied to any point in the receiver to determine the magnitude and polarity of the voltage of the point directly from the volt meter scale.

The wattage indicator channel

This channel includes a receptacle 91 for receiving the power or line plug of any device under test so that the device being tested is connected across the power mains through the line plug 92 of the testing instrument. The device under test is connected in series with the primary winding 93 of a current transformer (as distinguished from a voltage transformer) whose secondary winding 94 feeds a current rectifier tube 95, for example of the type 6H6. A potentiometer resistance 96 has its adjustable arm connected to the plate of tube 95. The cathode lead of the rectifier tube includes the calibrated potentiometer resistances 97, the adjustable arm 100 of which is connected to the control grid 98 of the indicator tube 99 which may be similar to tubes 38, 57, 64. The wattage of the device under test is determined by adjusting the arm 100 until the "eye" of indicator tube 99 just closes. The wattage indicator system is calibrated on the basis of an 80% power factor load which is the usual power factor of most radio receivers. Where a different power factor load is being tested, then a corresponding correction of the reading of arm 100 can be made. Inasmuch as the voltage supply to the device under test can be considered substantially constant, and since the transformer 93, 94, is a current transformer wherein the secondary current is proportional to the primary current, it is possible to calibrate the position of arm 100 in terms of power consumed. The manner of using the wattage indicator is substantially as follows. The line plug of the receiver or other device under test is inserted in the receptacle 91 and the line plug 92 of the instrument is plugged into an A. C. supply line of the proper voltage. After the tubes in the system have heated, the arm 100 is adjusted until the "eye" of indicator 99 just closes and the position of arm 100 directly indicates the wattage of the device being tested.

As will be seen from Fig. 1, all the channels of the instrument are supplied with power from the same source which includes the power supply transformer 101, full wave rectifier tube 102 and filter network 103 and a transformer winding 104 for supplying heating current to all the cathodes of the various tubes.

Referring to Fig. 2, there is shown a preferred construction of the probe that is used with the RF—IF and oscillator channels. The metal probe 47 terminates in a metal ferrule 111 which is suitably fastened in the end of an insulator tube 112. If desired, a pin (not shown) may extend through the tube and ferrule so as to prevent relative turning and longitudinal shifting thereof. Also fastened within the tube 112 is another metal ferrule 114 which is likewise rigidly secured in place by a transverse pin. An air gap 116 is thus provided between the opposed ends of the ferrules. The air gap is, in accordance with the invention, dimensioned so that the capacity between the members 111 and 114 is of the order of 1 or 2 micro-microfarads and preferably does not exceed 7 or 8 micro-microfarads. Soldered or otherwise fastened to member 114 is a multi-stranded wire 44 which is provided with a flexible insulator sheath 118 and an outer flexible metal sheath 43, for example of braided wire. Preferably the insulator tube 112 extends over the end of the sheath, the other end of wire 44 being connected to the tip of the telephone-type plug 42 (Fig. 1).

In certain cases it may be required to anchor the end of the probe to the point being tested, in which event the shank of probe 47 is provided with a raised threaded shoulder 120 which is adapted to receive an internally threaded brass tube 121 (Fig. 5) which has fastened to its forward end a spring slip 122 of known construction. Preferably the tube 121 is enclosed in an outer tube 123 of "Bakelite."

The voltmeter probe shown in Fig. 3 is of the same general construction as the RF—IF probe except that a high resistance 71 of the order of 1 megohm is connected between the wire 72 and the ferrule 111 which connects with the probe tip, the lead-in wires of the resistor are soldered to wire 72 and ferrule 111 as indicated by numeral 124.

The audio frequency probe shown in Fig. 4 is similar to the voltmeter probe except that the high resistance is omitted.

It will be obvious from the foregoing descriptions that the instrument is capable of testing practically any condition that may arise in such devices as radio receivers, amplifiers and the like. It is also capable of testing the condition of such elements as by-pass condensers or the like which cannot be checked by ordinary testing equipment without removing them from the circuit. Thus if it is desired to check the condition of the by-pass condenser, for example that shunting the conventional cathode biasing resistor in a radio or intermediate frequency amplifier, all that is necessary is to apply the RF—IF probe of the instrument to the end of the bias resistor which is connected to the cathode, and tuning the instrument of Fig. 1 to the frequency of the signals which are being impressed on the amplifier under test. If the resistor by-pass condenser is not defective there is very little signal potential at the point to which the probe is applied. If on the other hand the by-pass condenser is defective, or if its connections are imperfect or incorrect, then a definite indication will be given on the indicator 38. This applies to any place in the receiver where a signal by-pass condenser is used in shunt to a resistor or the like, for example in the screen circuits of screen grid tubes, plate circuits and the like.

There is shown in Fig. 6 in block diagrammatic form, how an instrument similar to that of Fig. 1 can be used to give simultaneous indications of conditions at a plurality of key points of a radio receiver of the superheterodyne type, comprising the various stages indicated, the instrument being indicated by the dotted line. The receiver under test is connected to a source of power, a signal generator is connected to the input of the receiver, and the set is tuned to the signal to be received in the normal way. If the receiver is operating normally and is not defective in any way, the power supply will supply the proper voltages to the various stages of the receiver, the voltage across the output of the power supply will be normal, the A. V. C. circuit will supply the proper A. V. C. voltages to the appropriate stages, and the signal levels will be normal throughout the receiver The plug 42 of the RF—IF probe is plugged into the jack 41 (Fig. 1) of the RF—IF channel and the probe point 47 is applied to the antenna or input terminal of the receiver whereupon the signal generator is adjusted so that a suitably strong signal is fed into the receiver. The RF—IF channel of the instrument is then tuned to the signal frequency and if the "eye" of indicator 38 overlaps, the input signal is reduced until the "eye" just closes. With this initial reference point the probe 47 can be placed at any suitable key-point of the radio or intermediate frequency stages of the receiver and by noting a change in the indication on "eye" of tube 38, it can be determined whether a gain or loss exists at the key-point. By adjusting the input attenuator and level controls 10 and 48 (Fig. 1), the magnitude of the gain can be determined and compared with the normal gain required at the key-point. In the same way the oscillator probe is connected to a key-point in the oscillator section of the receiver and the other end is plugged into jack 58. The voltmeter probe 70 also is applied to a suitable key-point in the power supply part of the receiver and the other end is plugged into the jack 81. Likewise the audio frequency probe is applied to a key-point in the audio frequency system of the receiver and the other end is plugged into plug 68; and the wattage indicator channel is adjusted to ascertain the power consumption of the receiver, it being understood that the receiver line plug is inserted in the receptacle 91 of the instrument. Thus the various indicators of the several channels provide a continuous check on the signal and operating voltages at the several key-points of the receiver. Merely for simplicity, the instrument of Fig. 1 employs the same indicator for the RF and IF portions of the receiver under test, but it will be understood that if desired, separate RF and IF indicators and separate RF and IF channels may be used as indicated in Fig. 6. Likewise a separate A. V. C. indicator and A. V. C. channel may be provided in the instrument and if desired a separate "output" indicator channel may also be provided, in which event individual probes and test cables will be used as indicated in Fig. 6. The instrument as a whole is indicated in Fig. 6 by the dotted rectangle and the various visual indicators corresponding to the indicators 38, 57, 64 and 99, are indicated by the corresponding numerals. Preferably, all the dials and indicators are arranged on the front panel of the instrument and for this purpose, the panel may be provided with openings O through which the "eye" or luminous target of each of the indicators is visible. While the instrument shown schematically in Fig. 6 illustrates the A. V. C. indicator and the voltage indicator as separate units, they can be combined in a single unit which can be used selectively to perform either of those functions. This single voltage indicator may also be used to indicate an automatic frequency control voltage; automatic volume control, and other voltage conditions.

Fig. 7 shows the instrument as used in testing a conventional audio frequency amplifier in which the various sections of the amplifier are indicated in the corresponding block portions of the diagram. The testing instrument which may be in accordance with that of Fig. 1 is indicated by the dotted rectangle. The testing instrument of course is not limited to the testing of audio amplifiers but is equally applicable to other types of amplifiers. In this figure, the amplifier is shown as consisting of a plurality of sections each of which may contain one or more electronic tubes deriving their power from one or more supply units as shown. Indicators "One," "Two" and "Three" of the testing instrument, may be used selectively or simultaneously for indicating the character of the signal in the various sections of the amplifier. Other indicators may be employed such as, for example, a voltage indicator selectively to indicate the power supply voltages and other key voltages, and a wattage indicator to indicate the power consumption of the amplifier. In certain cases, it may be desirable to connect a channel of the testing instrument directly to a tube contact. For example, there is shown in Fig. 8 how the instrument can be connected to the top or grid-contact 125 of any wellknown form of radio tube. Usually the contact 125 is connected to the control grid of the tube. The conductor of the shielded cable is indicated by the numeral 126, it being understood of course that this conductor is insulated from the outer metal braid 127 as disclosed for example in connection with Figs. 2, 3 and 4. The conductor 126 is connected to one terminal of a small condenser 128 of the order of 1 or 2 micro-microfarads. The other terminal of this condenser is connected to a spring 129 which is adapted to engage the usual connector cap 130 by means of which the wire 131 of the radio set is connected to the tube-cap 125. In order to complete the shielding of the test connector, it is provided with a metal cap 132 which is electrically connected to the metal braid covering 127 of the connector. The cap 132 is provided with a slot 133 to accommodate the insulated wire 131 which leads to the radio set. By this arrangement therefore, the utmost in screening action is obtained and connection may be made directly to the tube-cap 125 without danger of the condenser 128 being effected by stray capacities from the circuit under test and vice versa.

Wherever the expression "character of the signal" is used in the specification and claims, this expression is understood to include the presence or absence of the signal or any one or more identifying characteristics of the signal in the circuit or section or sections of the device under test.

While certain particular embodiments have been given in the foregoing specification, it should be understood that various changes and modifications may be made therein without departing from the spirit and scope of the invention.

This is in part a continuation of application Serial No. 206,213, filed May 5, 1938, issued December 31, 1940, as Patent No. 2,227,381.

What we claim is:

1. A wattmeter comprising a current transformer, means to connect a load to be measured in circuit with the primary of said transformer and a source of substantially constant voltage, a rectifier and a potentiometer serially connected across the secondary of said transformer, a calibrated scale for said potentiometer calibrated in terms of the power consumed by said load, and an indicator having a fluorescent screen and a control element, said element being connected to a movable arm on said potentiometer, said indicator having an anode connected through a rectifier, filter and transformer to said source of substantially constant voltage.

2. A wattmeter comprising a current transformer, means to connect a load to be measured in circuit with the primary of said transformer and a source of substantially constant voltage, a rectifier and a potentiometer serially connected across the secondary of said transformer, a calibrated scale for said potentiometer calibrated in terms of the power consumed by said load, and an indicator having a fluorescent screen upon which an image is produced, the shape of said image being controlled by voltages derived from and proportional to the setting of said potentiometer, said indicator having an anode connected through a rectifier, filter and transformer to said source of substantially constant voltage.

3. A wattmeter comprising a current transformer, means to connect a load to be measured in circuit with the primary of said transformer and a source of substantially constant voltage, a rectifier and a potentiometer serially connected across the secondary of said transformer, a calibrated scale for said potentiometer calibrated in terms of the power consumed by said load, and an indicator having a fluorescent screen and means for producing an image thereon, a control element in said indicator for determining the shape of said image as a function of the voltage thereof, means coupling said control element to said potentiometer, and means coupling said control element to said source of substantially constant voltage.

4. A wattmeter comprising a current transformer, means to connect a load to be measured in circuit with the primary of said transformer and source of substantially constant voltage, a rectifier and a potentiometer serially connected across the secondary of said transformer, a voltage transformer connected to said source of substantially constant voltage, a rectifier and a filter connected in the secondary circuit of said voltage transformer, an indicator actuated by the rectified output from said voltage transformer and by the potential from a movable arm on said potentiometer and a calibrated scale on said potentiometer calibrated in terms of the power consumed by said load.

JOHN F. RIDER.
JACK AVINS.